(12) United States Patent
Maan et al.

(10) Patent No.: US 11,983,689 B2
(45) Date of Patent: May 14, 2024

(54) METHOD AND SYSTEM FOR CUSTOMER RESPONSIVE POINT OF SALE DEVICE

(71) Applicant: Shopify Inc., Ottawa (CA)

(72) Inventors: Daanish Maan, Brampton (CA); Michael Joseph DeFazio, Fonthill (CA)

(73) Assignee: Shopify Inc., Ottawa (CA)

( * ) Notice: Subject to any disclaimer, the term of this patent is extended or adjusted under 35 U.S.C. 154(b) by 81 days.

(21) Appl. No.: 17/707,333

(22) Filed: Mar. 29, 2022

(65) Prior Publication Data

US 2023/0316254 A1    Oct. 5, 2023

(51) Int. Cl.
*G06Q 20/20* (2012.01)

(52) U.S. Cl.
CPC ................. *G06Q 20/206* (2013.01)

(58) Field of Classification Search
CPC ......... G06Q 20/206; G06Q 20/20; G09G 5/00
See application file for complete search history.

(56) References Cited

U.S. PATENT DOCUMENTS

| | | | | |
|---|---|---|---|---|
| 4,570,223 A * | 2/1986 | Yoshimoto | ................ | G07F 7/02 235/375 |
| 6,567,787 B1 * | 5/2003 | Walker | .................... | G07F 9/026 705/16 |
| 7,127,706 B2 * | 10/2006 | Mason | ...................... | G06F 8/60 717/121 |
| 7,336,174 B1 * | 2/2008 | Maloney | .................. | B25H 3/00 340/568.1 |
| 8,494,576 B1 * | 7/2013 | Bye | ......................... | G07C 9/27 713/182 |
| 9,275,382 B2 * | 3/2016 | Dubois | ..................... | G07G 1/12 |
| 9,275,526 B2 * | 3/2016 | Skiles | ...................... | A47F 9/046 |
| 9,325,949 B2 * | 4/2016 | Moriarty | .................. | H04N 7/18 |
| 9,953,231 B1 * | 4/2018 | Medina, III | .......... | G06V 40/45 |
| 10,140,829 B1 * | 11/2018 | Calvarese | ............ | G08B 13/246 |
| 10,275,753 B2 * | 4/2019 | Nishiie | .................. | G07F 7/1025 |
| 10,311,419 B2 * | 6/2019 | Hayhow | ............ | G06Q 30/0185 |
| 10,546,108 B1 * | 1/2020 | Eidam | ................... | H04W 12/06 |
| 10,769,562 B2 * | 9/2020 | Morgenthau | ......... | G08B 21/043 |
| 11,514,419 B2 * | 11/2022 | Jung | ..................... | G06F 21/629 |
| 2002/0093425 A1 * | 7/2002 | Puchek | .................... | G07C 9/23 340/541 |
| 2002/0148896 A1 * | 10/2002 | Persky | ..................... | G07G 1/01 235/383 |

(Continued)

FOREIGN PATENT DOCUMENTS

| | | | | |
|---|---|---|---|---|
| EP | 3244363 A1 | 11/2017 | | |
| JP | 2001076261 A | * | 3/2001 | |
| WO | WO-2020045196 A1 | * | 3/2020 | ............. G06Q 20/18 |

OTHER PUBLICATIONS

Canadian Intellectual Property Office (CIPO) Official Action and Examination Search Report for Application No. 3,169,463 dated Sep. 28, 2023, 5 pages.

*Primary Examiner* — Ashford S Hayles
(74) *Attorney, Agent, or Firm* — Moffat & Co

(57) ABSTRACT

A computer-implemented method comprising receiving captured sensor data; detecting, based on the captured sensor data, a person proximate a point of sale terminal; determining a category for the detected person proximate the point of sale terminal; and selectively providing access to functionality at the point of sale terminal based on the determined category of the detected person.

18 Claims, 8 Drawing Sheets

(56) References Cited

U.S. PATENT DOCUMENTS

| | | | | |
|---|---|---|---|---|
| 2002/0169673 A1* | 11/2002 | Prorock | G06Q 20/206 | 705/16 |
| 2002/0170782 A1* | 11/2002 | Millikan | G07G 1/0054 | 186/61 |
| 2003/0150911 A1* | 8/2003 | Joseph | G06Q 20/206 | 235/382 |
| 2004/0065740 A1* | 4/2004 | Mergenthaler | G06K 7/1096 | 235/462.14 |
| 2004/0133477 A1* | 7/2004 | Morris | G06Q 30/0603 | 348/E7.086 |
| 2004/0135801 A1* | 7/2004 | Thompson | G06Q 40/128 | 715/702 |
| 2005/0046570 A1* | 3/2005 | Conzola | G06Q 20/204 | 340/568.1 |
| 2005/0206501 A1* | 9/2005 | Farhat | G07C 9/257 | 340/5.82 |
| 2005/0278776 A1* | 12/2005 | Kitagawa | G06F 21/35 | 235/382 |
| 2006/0076404 A1* | 4/2006 | Frerking | G06F 21/32 | 235/382 |
| 2007/0006298 A1* | 1/2007 | Malone | G06F 21/35 | 726/17 |
| 2007/0083915 A1* | 4/2007 | Janakiraman | G06F 21/6218 | 726/4 |
| 2007/0257768 A1* | 11/2007 | Bowers | G06F 21/74 | 340/10.5 |
| 2008/0029603 A1* | 2/2008 | Harris | G06K 7/10861 | 235/462.31 |
| 2008/0094211 A1* | 4/2008 | Teller | G06Q 20/203 | 340/10.1 |
| 2008/0172733 A1* | 7/2008 | Coriaty | G06F 21/35 | 726/19 |
| 2008/0223926 A1* | 9/2008 | Miller | G07C 9/37 | 235/382 |
| 2008/0229409 A1* | 9/2008 | Miller | G06F 21/32 | 726/19 |
| 2009/0115849 A1* | 5/2009 | Landers, Jr. | G08B 13/19613 | 348/E7.001 |
| 2009/0182630 A1* | 7/2009 | Otto | G06Q 20/206 | 705/14.1 |
| 2009/0204504 A1* | 8/2009 | De Araujo | G07G 1/0009 | 705/16 |
| 2009/0295534 A1* | 12/2009 | Golander | G07C 9/28 | 340/5.2 |
| 2010/0079250 A1* | 4/2010 | Fukushima | G06F 21/35 | 340/10.1 |
| 2010/0114746 A1* | 5/2010 | Bobbitt | G06Q 30/06 | 705/1.1 |
| 2010/0265039 A1* | 10/2010 | Clements | G05B 19/418 | 340/5.83 |
| 2012/0162422 A1* | 6/2012 | Lester | G07F 13/025 | 348/148 |
| 2013/0251216 A1* | 9/2013 | Smowton | G06V 40/67 | 713/150 |
| 2015/0032557 A1* | 1/2015 | Suzuki | G07G 1/0018 | 705/16 |
| 2015/0170499 A1* | 6/2015 | Bower | H04W 4/70 | 340/686.6 |
| 2015/0269818 A1* | 9/2015 | Jain | G08B 13/2488 | 340/572.1 |
| 2015/0332242 A1* | 11/2015 | Perry | G06Q 20/206 | 705/18 |
| 2015/0339871 A1* | 11/2015 | Wagner | G07C 9/20 | 340/5.81 |
| 2016/0005020 A1* | 1/2016 | Fernando | G06Q 20/202 | 705/21 |
| 2016/0063471 A1* | 3/2016 | Kobres | G06Q 20/40 | 705/18 |
| 2016/0063492 A1* | 3/2016 | Kobres | H04L 63/102 | 705/16 |
| 2016/0063503 A1* | 3/2016 | Kobres | G06Q 20/40 | 705/18 |
| 2016/0093184 A1* | 3/2016 | Locke | H04N 7/183 | 348/143 |
| 2016/0125376 A1* | 5/2016 | Beatty | G06Q 20/202 | 705/72 |
| 2016/0171451 A1* | 6/2016 | Pugh | G06Q 10/1091 | 705/7.18 |
| 2016/0269399 A1* | 9/2016 | Abreu | H04L 63/0861 | |
| 2016/0308859 A1* | 10/2016 | Barry | G07C 9/22 | |
| 2016/0379145 A1* | 12/2016 | Valentino, III | G06Q 10/105 | 705/7.13 |
| 2017/0185985 A1* | 6/2017 | Harada | G06F 18/28 | |
| 2017/0316397 A1* | 11/2017 | Miyagi | G06F 21/32 | |
| 2017/0372286 A1* | 12/2017 | Hiroi | G06Q 20/202 | |
| 2018/0041518 A1* | 2/2018 | Jacobs | H04W 12/06 | |
| 2018/0276636 A1* | 9/2018 | Kobayashi | G06Q 20/40145 | |
| 2018/0314863 A1* | 11/2018 | Gao | G06K 7/1456 | |
| 2019/0005480 A1* | 1/2019 | Jung | G06F 21/629 | |
| 2019/0095737 A1* | 3/2019 | Hecker | G06V 40/162 | |
| 2019/0122196 A1* | 4/2019 | Lauria | G07G 1/009 | |
| 2019/0340347 A1* | 11/2019 | Long | H04W 12/47 | |
| 2020/0035070 A1* | 1/2020 | Ogawa | G07G 1/0072 | |
| 2020/0090151 A1* | 3/2020 | Francis | G06Q 20/3224 | |
| 2020/0184230 A1* | 6/2020 | Liu | G06T 7/70 | |
| 2020/0193401 A1* | 6/2020 | Vedula | G06Q 20/202 | |
| 2020/0202091 A1* | 6/2020 | Wilfred | G06K 7/1096 | |
| 2020/0349249 A1* | 11/2020 | Weston | G06V 40/171 | |
| 2020/0357129 A1* | 11/2020 | Linder | G06T 17/205 | |
| 2020/0380224 A1* | 12/2020 | Barkan | G06K 7/1096 | |
| 2021/0014070 A1* | 1/2021 | Gopalakrishnan | H04L 9/3242 | |
| 2021/0064140 A1* | 3/2021 | Egan | G06Q 20/204 | |
| 2021/0117945 A1* | 4/2021 | Truong | G06Q 20/202 | |
| 2021/0192486 A1* | 6/2021 | Uchimura | G07G 3/00 | |
| 2021/0216729 A1* | 7/2021 | Gao | G06K 7/12 | |
| 2021/0304186 A1* | 9/2021 | Brosnan | G07G 1/0081 | |
| 2021/0326826 A1* | 10/2021 | Guise | G06Q 20/20 | |
| 2021/0365990 A1* | 11/2021 | Lau | G06Q 30/02 | |
| 2021/0375104 A1* | 12/2021 | Handshaw | G06Q 20/204 | |
| 2022/0261465 A1* | 8/2022 | Levitov | G06V 40/45 | |
| 2023/0252442 A1* | 8/2023 | Singh | G06Q 20/322 | 705/23 |

* cited by examiner

METHOD AND SYSTEM FOR CUSTOMER RESPONSIVE POINT OF SALE DEVICE

FIELD OF THE DISCLOSURE

The present disclosure is related to the performance of transactions at a point of sale terminal, and in particular relates to the performance of transactions at a point of sale terminal in a retail location.

BACKGROUND

In a retail environment, completion of sales by a customer typically occurs at a point of sale terminal. This typically involves the customer proceeding to a point of sale terminal staffed by a clerk or retail employee, or by proceeding to a dedicated self checkout.

SUMMARY

When proceeding to a sales terminal that is generally used by store employees, a customer may arrive at a point of sale terminal and find no store employees nearby. In this case, the customer can either wait for a store employee to arrive or proceed to a different point of sale terminal. This can be frustrating for the customer.

The subject-matter of the present application relates to detection of a person proximate to a point of sale terminal. Such a person or persons may be identified and/or classified persons, and the configuration of the point of sale terminal may be adjusted, made, and/or modified based on such classification. For example, a customer may proceed to a point of sale terminal with no store employees nearby. In accordance with some embodiments of the present disclosure, sensors may detect the presence of the customer proximate to the point of sale terminal and find no matching entries in a database of sales associates that would correspond with the person proximate to the point of sale terminal. In this regard, the system would identify the person as a customer and would configure the point of sale terminal into a self checkout mode to allow the customer to process their own transactions. In some cases, a staff member could be dispatched to assist the customer if they are free. For example, in some cases a customer may not want to perform self-checkout, and may instead be detected proximate the terminal. The computing system may in this case notify a staff member, for example on a mobile point-of-sales device, via a message such as a text message (short message service (SMS)) or email to their personal device, among other options, that the sales counter is unattended. This may facilitate a transaction where the customer otherwise may wait at the point of sale terminal and then leave.

In other cases, a store employee may move next to a point of sale terminal, and sensors may detect the presence of the store employee. The store employee may then be identified as a store employee based on sensor input and the point of sale terminal could then be configured for a store employee mode of operation. Other examples of the configuration of a point of sale terminal based on the identification of a category of person next to such point of sale terminal are described below.

Therefore, in one aspect, a computer-implemented method may be provided. The computer-implemented method may include receiving captured sensor data and detecting, based on the captured sensor data, a person proximate a point of sale terminal. The computer-implemented method may further include determining a category for the detected person proximate the point of sale terminal and selectively providing access to functionality at the point of sale terminal based on the determined category of the detected person.

In some embodiments, the determining may use biometric data stored for people in at least one category to make the determination.

In some embodiments, the biometric data may be for authorized store clerks associated with a retail establishment for the point of sales terminal.

In some embodiments, prior to detecting the person, the point of sale terminal may be in a point of sale mode, and wherein determining the category for the detected person proximate the point of sale terminal may include determining that the detected person is not an authorized store clerk, and wherein selectively providing access to functionality at the point of sale terminal based on the determined category of the detected person may include switching the point of sale terminal from the point of sale mode to a self-checkout mode.

In some embodiments, prior to detecting the person, the point of sale terminal may be in a self-checkout mode, and wherein determining the category for the detected person proximate the point of sale terminal may include determining that the detected person is an authorized store clerk, and wherein selectively providing access to functionality at the point of sale terminal based on the determined category of the detected person may include providing access to functionality not available to a customer in the self-checkout mode.

In some embodiments, a first category may be a store clerk category and a second category may be a customer category, and wherein when the person detected is in the store clerk category, the method may provide elevated permissions at the point of sale terminal over permissions provided when the person detected is in the customer category.

In some embodiments, the sensor data may include images captured by a camera associated with the point of sale terminal.

In some embodiments, the sensor data may include images captured by at least one security camera associated with a retail location for the point of sale terminal.

In some embodiments, the sensor data may include short range communications from a device associated with a store clerk.

In some embodiments, the method may selectively provide access by configuring a user interface at the point of sale terminal based on the determined category.

In a further aspect, a computing device may be provided. The computing device may include a processor and a communications subsystem. The computing device may be configured to receive captured sensor data and detect, based on the captured sensor data, a person proximate a point of sale terminal. The computing device may be configured to determine a category for the detected person proximate the point of sale terminal and selectively provide access to functionality at the point of sale terminal based on the determined category of the detected person.

In some embodiments, the computing device may be configured to determine using biometric data stored for people in at least one category to make the determination.

In some embodiments, the computing device may be associated with the point of sale terminal, wherein the computing device may further comprise at least one display; at least one input device; and one or more sensors; wherein the captured sensor data may come from the one or more sensors associated with the computing device.

In some embodiments, the computing device may be separate from the point of sale terminal, wherein the computing device may be configured to selectively provide access to functionality by providing configuration messages to the point of sale terminal.

In some embodiments, the computing device may, prior to detecting the person, be configured to set the point of sale terminal in a point of sale mode, and wherein, when the computing device determines the category for the detected person proximate the point of sale terminal the computing device, the computing device may further be configured to determine that the detected person is not an authorized store clerk, and wherein selectively providing access to functionality at the point of sale terminal based on the determined category of the detected person may include switching the point of sale terminal from the point of sale mode to a self-checkout mode.

In some embodiments, the computing device, prior to detecting the person, may be configured to set the point of sale terminal in a self-checkout mode, and wherein, when the computing device determine the category for the detected person proximate the point of sale terminal, the computing device may further be configured to determine that the detected person is an authorized store clerk, and wherein selectively providing access to functionality at the point of sale terminal based on the determined category of the detected person may include providing access to functionality not available to a customer in the self-checkout mode.

In some embodiments, the sensor data may include images captured by at least one security camera associated with a retail location for the point of sale terminal.

In some embodiments, the sensor data may include short range communications from a device associated with a store clerk.

In some embodiments, the computing device may be configured to selectively provide access by configuring a user interface at the point of sale terminal based on the determined category.

In a further aspect, a non-transitory computer readable medium for storing instruction code may be provided. The instruction code, when executed by a processor of a computing device may cause the computing device to receive captured sensor data and detect, based on the captured sensor data, a person proximate a point of sale terminal. The instruction code, when executed by a processor of a computing device may further cause the computing device to determine a category for the detected person proximate the point of sale terminal and selectively provide access to functionality at the point of sale terminal based on the determined category of the detected person.

BRIEF DESCRIPTION OF THE DRAWINGS

The present disclosure will be better understood with reference to the drawings, in which.

DETAILED DESCRIPTION

Figure 1:
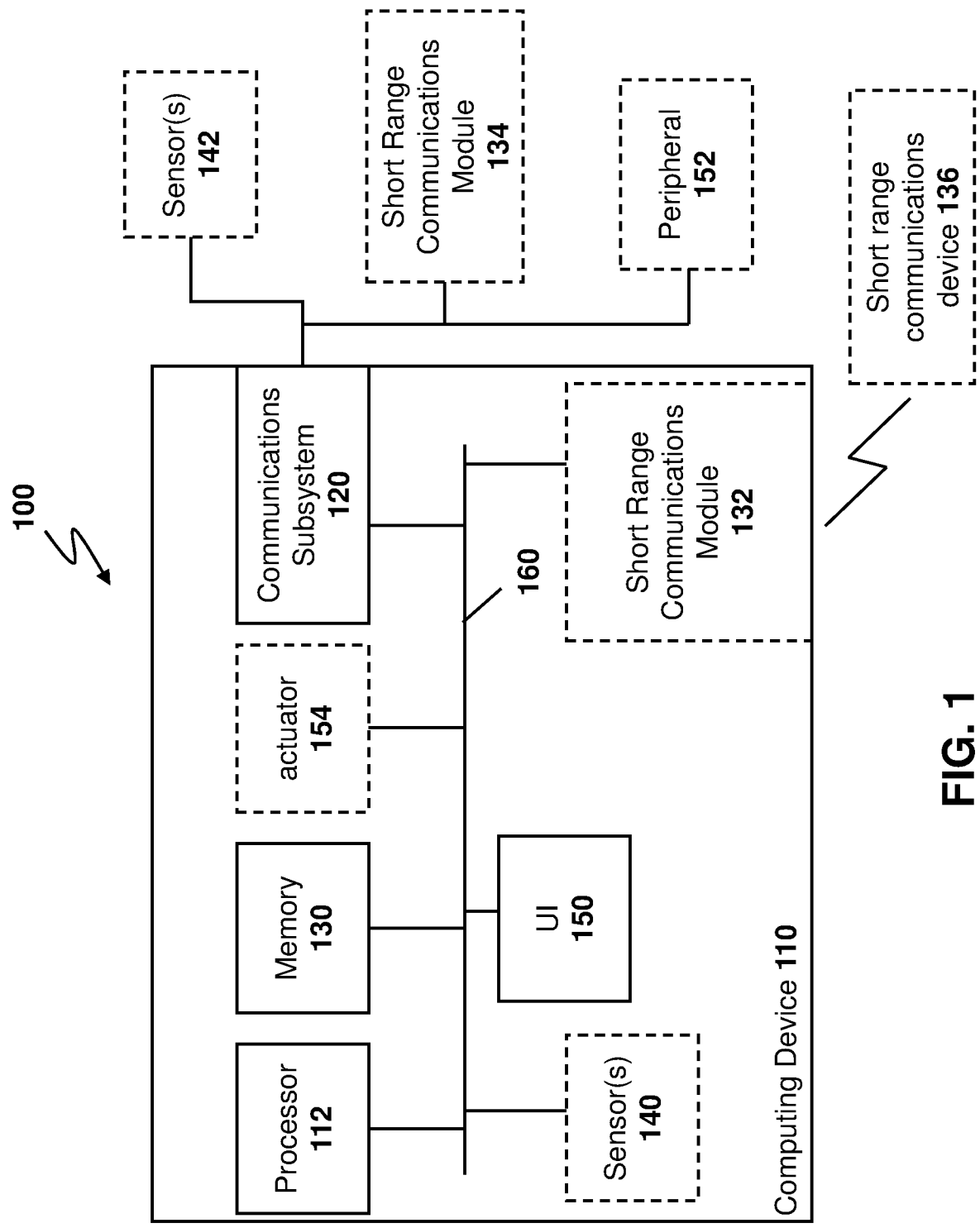
FIG. 1 is a block diagram showing an example computer system capable of being used with the embodiments of the present disclosure.

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

In accordance with various embodiments of the present disclosure, a computer system such as a Point of Sale (POS) terminal or a network computing device may utilize information from sensors, either associated with the POS terminal or external to the POS terminal, to detect whether a person is proximate the POS terminal. As used herein, proximate is within a threshold distance from the POS terminal. For example, the person could be next to, within a certain measurement of the POS terminal, near to, among other options. In some cases, the threshold distance does not need to be uniform around the POS terminal. For example, the threshold distance might be one meter if the person is to the sides of the POS terminal, and 1.5 meters if the person is in front of or behind the POS terminal. In some cases the threshold distance may be directional. Thus, if a person is in front of the POS terminal this may be considered proximate the POS terminal, but if the person is behind or to the sides of the POS terminal, this may not be proximate the POS terminal. Other examples are possible.

If a person is detected, the captured sensor information may be used to determine a category of the person. For example, biometric data regarding store clerks may be stored in a computer system and be used to determine if the person proximate to the POS terminal is a store clerk or other user.

Based on the determination, various functionality at the POS terminal may be configured. For example, if the category of person is not a store clerk category (e.g., the person is not detected to be a known store clerk), the user interface on the POS terminal may be configured to a self checkout mode, and the permissions at the POS terminal may differ from those that would exist if a store clerk were present. In some cases, options such as returns, processing coupons, removing items already scanned, or other actions, may be restricted based on the category of person In some cases, physical changes may be made at the POS terminal based on the determination. For example, a screen at the POS terminal may be angled to face a customer, scanners near a customer may be enabled, among other options.

Therefore, in some cases, a system is provided that detects when a customer is at a physical point of sale device, but the merchant is not, and may react or respond by putting the point of sale device in a self checkout mode. In alternative embodiments, the system may by default be in a customer mode and may react or respond to a store clerk being proximate to the point of sale terminal by putting the point of sale terminal into a store clerk mode.

This may be done by capturing sensor data to make a determination of who is next to the point of sale terminal, and then changing the operation of the point of sale terminal based on such determination.

Computer System

In some embodiments, the Point of Sale terminal may be a computing device or part of a computing system capable of performing the embodiments of the present disclosure.

Reference is now made to FIG. 1, which shows an example, simplified, computing system 100. In the example of FIG. 1, a computing device 110 may include a processor 112 and a communications subsystem 120, where the processor 112 and the communications subsystem 120 cooperate to perform the methods of the embodiments described herein.

Processor 112 is a hardware processor configured to execute programmable logic, which may be stored, along with data, on computing device 110 and shown in the example of FIG. 1 as memory 130. Memory 130 can be any tangible, non-transitory computer readable storage medium such as optical (e.g., CD, DVD, etc.), magnetic (e.g., tape), flash drive, hard drive, or other memory known in the art.

Alternatively, or in addition to memory 130, computing device 110 may access data or programmable logic from an external storage medium, for example through communications subsystem 120.

Communications subsystem 120 allows computing device 110 to communicate with other devices or network elements and the design of communications subsystem 120 may be based on various types of communications being performed. Further, communications subsystem 120 may comprise a plurality of communication technologies, including any wired or wireless communication technology.

In some cases, communications subsystem 120 may therefore allow communications with other devices such as network servers, whether local or remote.

In other cases, communications subsystem may simply include a serial port or other communications port to allow data to be uploaded to computing device 110. For example, data such as biometric data as described below may be uploaded over a Universal Serial Bus connected to an external memory source in some cases.

In some cases, sensors may be associated with the computing device 110. Such sensors may be internal sensors, shown as sensors 140 in the embodiment of FIG. 1. In other cases, the sensors may be external and are shown as sensors 142 in the embodiment of FIG. 1. In certain circumstances, a combination of internal and external sensors may also be used with computing device 110 within computer system 100.

Sensors 140 or 142 may consist of various sensors that can be used to determine whether a person is proximate or near to the point of sale terminal. For example, in some cases, the sensors may comprise cameras or other image capture modules that can be used in determining whether a person is in view thereof. In other cases, sensors may include proximity modules such as an IR detector, RADAR, LIDAR, among others that can be used in determining whether a person is detected near to the POS terminals. In still other situations, the sensors may include motion sensors such as passive infrared (PIR), microwave, ultrasonic, tomographic motion detectors, gesture detectors, among other options that can be used in determining whether motion is detected within the sensing area of these sensors. In other cases, the sensors can include bump sensors such as accelerometers, pressure sensors, among others that can be used to detect contact with such sensors, indicating interaction with such sensors. For example, in some cases, the sensors may be floor mats beside the point-of-sale terminal. In some cases, the sensors may be biometric sensors such as fingerprint scanners, that can be used to detect characteristics of those interacting with the sensors. In some cases, the sensors may be barcode scanners that can be used in determining whether an identifier such as a badge has an identifier associated therewith. In various circumstances, a plurality of sensors may exist and be associated with the computing system. Thus, a combination of the various types of sensors may be available within the computing system.

In the embodiment of FIG. 1, computing device 110 may in some cases include a short-range communications module 132. For example, computing device 110 may consist of a point-of-sale terminal NFC reader, an RFID reader, a BlueTooth™ chipset, an IrDA system, among other options. In the example of FIG. 1, short-range communications module 132 is internal to computing device 110. However, in other embodiments, the short-range communications module may be external to the computing device 110. For example, in the case that the short-range communications module is an add-on to the computing device 110, the short-range communications module may be external and may communicate through communications subsystem 120. This is shown in the embodiment of FIG. 1 as short-range communications module 134.

In this case, a short range communication device 136 may be brought into proximity with the short-range communications module 132 in order to have information stored on, or derived by, short range communications device 136 transmitted to the short-range communications module 132.

For example, short range communications device 136 may be any token or any type of fob, such as a watch, watchband, mobile device such as a smart phone, jewelry, tags, badges, among other such devices as may be equipped with short-range communications hardware (e.g., an NFC transceiver).

In other cases, short range communications module 132 may be an RFID reader and the short range communications device may be a fob with the corresponding RFID technology. In this case, the short-range communications module 132 may issue a challenge to the short range communications device 136 which will then be responded to from the short range communications device 136. The short-range communications module 132 can then compare the results from the challenge with the expected results in order to determine whether to accept the transaction or not.

In still further cases, short range communications device 136 can be any short-range communications device capable of interacting with the short-range communications module 132. For example, short range communications device 136 may include a badge or tag worn by store clerks, a mobile device carried by store clerks which may communicate through short range communications such as Bluetooth or Near Field Communications (NFC) with short range communications module 132, a transaction device carried by store clerks which may communicate through short range communications such as Bluetooth or NFC with short range communications module 132, among other options.

In the embodiment of FIG. 1, computing device 110 further includes a user interface (UI) 150. The user interface 150 can be any auditory, visual or a haptic feedback mechanism to provide a user with information. For example, user interface 150 could be a display screen, light, speaker, vibration mechanism, among other options.

In some cases, the UI 150 could include a touch screen to allow user interaction with the computing device 110. In some cases, the UI could include a keyboard, keypad, smart pen, or other input device.

In some cases, other peripherals 152 could be associated with computer system 100. For example, a cash drawer may be one such peripheral. In other cases, receipt printers may be a peripheral. However, this is not meant to be limiting and a point of sale terminal or similar computing system may have other peripherals.

In some cases, actuators 154 may optionally be provided as part of computing system 100. For example, as described below, such actuators may include motors or servos capable of moving a display screen based on a person detected.

Communications between the various modules within a computing device can be done in a variety of ways. In the example of FIG. 1, a bus 160 is shown to allow communications between the various modules. However, this is merely provided for illustration purposes and other types of communication between modules is possible.

Figure 2:
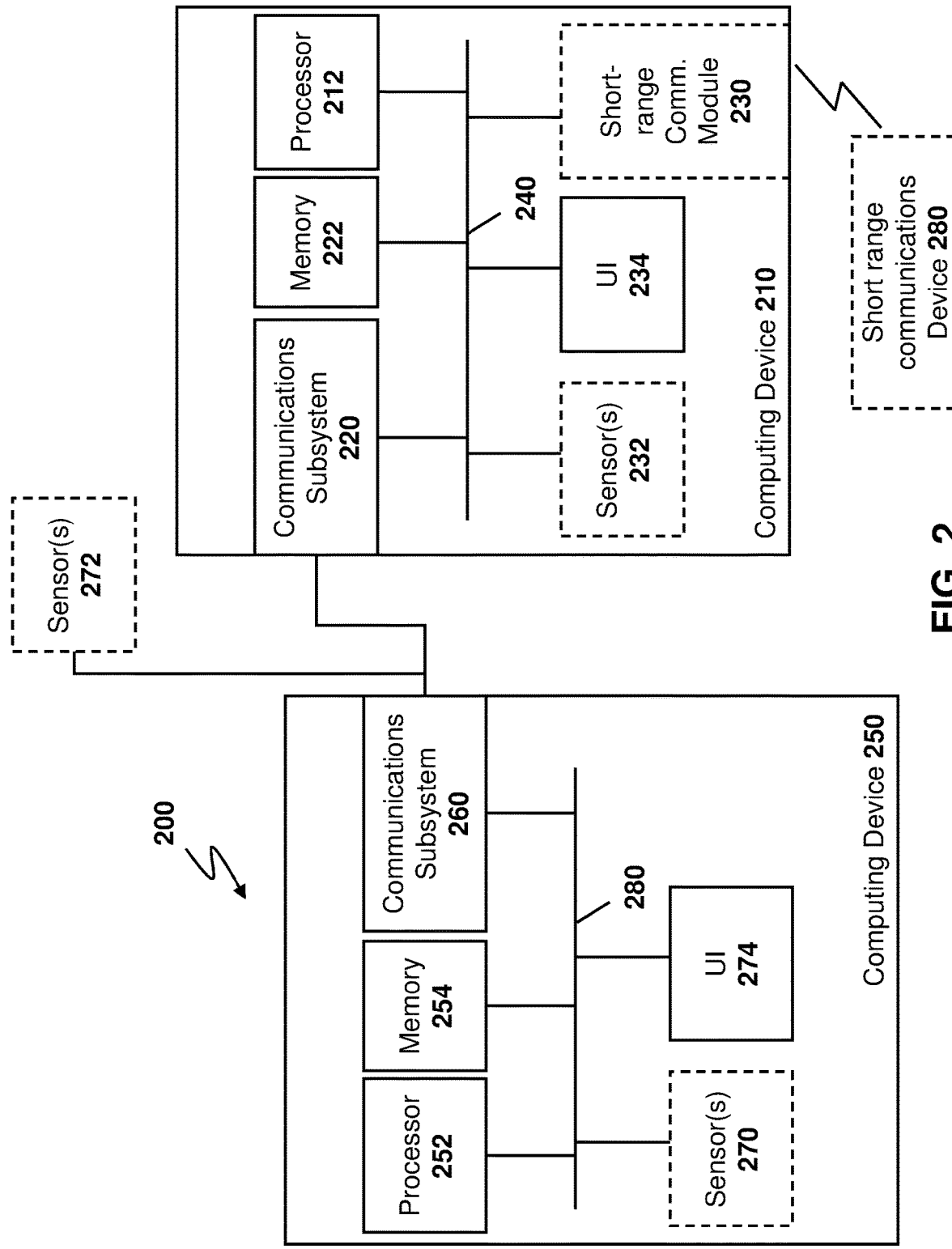
FIG. 2 is a block diagram showing a further example computer system capable of being used with the embodiments of the present disclosure.

While the embodiment of FIG. 1 shows a single computing device with internal or external sensors and/or internal or external short-range communications modules, in other cases, a plurality of computing devices may exist within a computer system. Reference is now made to FIG. 2.

In the example of FIG. 2, a simplified computing system 200 having a first computing device 210 and a second computing device 250 is shown. In particular a computing device 210 may be associated with a point of sale terminal and be similar to computing device 110 from FIG. 1. Computing device 210 includes a processor 212 and a communications subsystem 220, where the processor 212 and the communications subsystem 220 cooperate to perform the methods of the embodiments described herein.

Processor 212 is a hardware processor configured to execute programmable logic, which may be stored, along with data, on computing device 210 and shown in the example of FIG. 2 as memory 222. Memory 222 can be any tangible, non-transitory computer readable storage medium such as optical (e.g., CD, DVD, etc.), magnetic (e.g., tape), flash drive, hard drive, or other memory known in the art.

Alternatively, or in addition to memory 222, computing device 210 may access data or programmable logic from an external storage medium, for example through communications subsystem 220.

Communications subsystem 220 allows computing device 210 to communicate with other devices or network elements and the design of communications subsystem 220 may be based on various types of communications being performed. Further, communications subsystem 220 may comprise a plurality of communication technologies, including any wired or wireless communication technology.

In the embodiment of FIG. 2, computing device 220 may have a short-range communications module 230. For example, this may consist of an NFC reader, an RFID reader, Bluetooth chipset, IrDA chipset, among other options. In the example of FIG. 2, short-range communications module 230 is internal to computing device 210. However, in other embodiments, the short-range communications module may be external to the computing device 210.

Further, other sensors may be associated with the computing device 210. Such sensors may be internal sensors, shown as sensors 232 in the embodiment of FIG. 2. In other cases, the sensors may be external to the computing device. In certain circumstances, a combination of internal and external sensors may also be used with computing device 210.

Sensors 232 may consist of various sensors that can be used to analyse whether a person is proximate to a point of sales terminal in some cases. For example, in some cases, the sensors may comprise cameras or other image capture modules. In other cases, sensors may include proximity modules such as an IR detector, RADAR, LIDAR, among others. In still other situations, the sensors may include motion sensors such as passive infrared (PIR), microwave, ultrasonic, tomographic motion detectors, gesture detectors, among other options. In other cases, the sensors can include bump sensors such as accelerometers, pressure sensors, among others. In some cases, the sensors may be biometric sensors such as fingerprint scanners. In some cases, the sensors may be barcode scanners. In various circumstances, a plurality of sensors may exist and be associated with the computing system. Thus, a combination of the various types of sensors may be available within the computing system.

In one embodiment of FIG. 2, computing device 210 further may include a user interface (UI) 234. The user interface 234 can be any auditory, visual or a haptic feedback mechanism to provide a user with information. For example, user interface 234 could be a display screen, light, speaker, vibration mechanism, among other options.

In some cases, the UI 234 could include a touch screen to allow user interaction with the computing device 210. In some cases, the UI could include a keyboard, keypad, smart pen, or other input device.

In some cases, other peripherals (not shown) could be associated with computer system 100. For example, a cash drawer may be one such peripheral. In other cases, receipt printers may be a peripheral. However, this is not meant to be limiting and a point of sale terminal or similar computing system may have other peripherals.

In some cases, actuators may optionally be provided as part of computer device 210. For example, as described below, such actuators may include motors or servos capable of moving a display screen based on a person detected Communications between the various modules within the computing device 210 can be done in a plurality of ways. In the example of FIG. 2, a bus 240 is shown to allow communications between the various modules. However, this is merely provided for illustration purposes and other types of communication between modules is possible.

Further, in the embodiment of FIG. 2, a second computing device 250 is provided. Computing device 250 may be an external computing device that is somehow associated with the computing device 210. For example, computing device 250 may be a computing device for an operator, including a mobile device or tablet that is somehow associated with a stand-alone point-of-sale terminal. In other examples, computing device 250 may be a network server that is used to perform the processing or is provided as a backend for a particular computing system. For example, in some cases, computing device 250 may be used to perform image processing. In other cases, computing device 250 may be a security system computing device associated with security staff. Other examples are possible.

As with computing device 210, computing device 250 may include a processor 252 and a communications subsystem 260, where the processor 252 and communications subsystem 260 cooperate to perform the methods of the present disclosure.

Processor 252 may use programmable logic to execute instructions stored in a memory 254. Further memory 254 may store other data and may be any non-transitory computer storage medium.

In some embodiments, computing device 250 includes sensors 270 internal to the computing device or sensors 272 external to the computing device. Such sensors may be similar to sensors 140 or sensors 142 from the embodiment of FIG. 1.

Further, in some cases computing device 250 may include a user interface 274 which may be used to provide visual, auditory or haptic feedback to a user of computing device 250. In this case, the user of computing device 250 may be different from the person near computing device 210. For example, in some cases the user of computing device 250 may be a security staff member for a building, a technology support person, a store manager or other store clerk, among other options. Other examples are possible.

In the embodiment of FIG. 2, communications between various modules are provided using bus 280. Again, communications between modules can be done in a variety of ways and bus 280 illustrates only a possible example.

Communications between computing device 210 and computing device 250 may occur through various mechanisms. For example, communications subsystem 220 may communicate with communications subsystem 260 through a wired or wireless connection such as ethernet, Bluetooth, Wi-Fi, USB, other serial port, among others. In other cases, communications subsystem 220 may communicate through a network such as, for example, the Internet, among other similar options, with communications subsystem 260. In this case, each of communications subsystems 220 and 260 may use wired or wireless communications to communicate with a router which may then route the communications over such a network. Such communications may include but are not limited to cellular, satellite, Wi-Fi, ethernet, fiber, among others.

In some cases, the embodiments of FIG. 1 or FIG. 2 could be combined, or more or fewer computing devices could be included in a computer system. The present disclosure is not limited to the embodiments of FIGS. 1 and 2, which are provided to illustrate examples of various computing systems.

Detecting a Person Near a Point of Sale Terminal and Taking Action

Utilizing a computer system such as those described above with regard to FIGS. 1 and 2, various sensors can be used to determine whether or not a person is proximate a point of sales terminal, whether that person belongs to a specific category of persons, and configuring the computing device based on the determination.

Various sensors, or combination of sensors, may be utilized to determine a category for the person next to a point of sale terminal. As described above, the person may be proximate or next to a point of sale terminal if they are within a threshold distance of the POS terminal. In some cases the threshold distance may be directional, such as within a particular arc around the POS terminal. Other options are possible.

The determined categories may include a category for customers and a category for a sales associates or clerks in some cases. However, in some cases, categories may be more granular, and may include categories for a new or unknown customer, a returning or loyalty member customer, a store clerk, a customer service representative, a stocking clerk, a greeter and/or or a manager, among other options.

In one example, the point of sale terminal may be equipped with various sensors. For example, the point of sale terminal may include at least one camera. Images obtained by the camera may be used to detect that a person is proximate to the point of sale terminal. For example, a processor may analyze an image and compare the image with a known image where no one is present to find whether the differences between the two images indicate the presence of a person. Other forms of image processing would also be known to those in the art.

The image obtained by the camera can also be processed by a processor to perform facial recognition. Specifically, the employees or store clerks of the merchant may have images in a database of images that could be used to determine whether the person proximate to the point of sale terminal is an employee or not. Such processor may be part of the point of sale terminal, at a local computer or at a network computer. If using a remote computer such as a network computer to perform facial recognition, in some cases an image may be captured by the camera and transmitted via a network to the network computer. The transmission may involve the use of any wired or wireless technology, including ethernet, Wi-Fi, cellular, satellite, among other technologies, or a combination thereof.

In some cases, two cameras may be employed by the point of sale terminal. This may be the case, for example, if the point of sale terminal is on a traditional sales counter where an employee would stand behind the counter and a customer would stand in front of the counter. In this case, both cameras may be used to detect people proximate the point of sale terminal and make determinations about the people proximate the point of sale terminal. For example, if the person is behind the counter, in some cases this may be indicative of an employee and it may therefore be determined that an employee is proximate to the point of sale terminal. In some cases, facial recognition may further be employed.

The camera(s) may be part of the base of the terminal, associated with the screen of the terminal, associated with a detachable base, among other options.

In other cases, if two or more people are beside the point of sale terminal, then the image may be analyzed to determine if one of the people is a store employee or sales associate. This may occur, for example, if the store clerk proceeds to the same side of the counter as a customer or if the point of sale terminal is located on a counter with only one side. If a store clerk is identified, in one embodiment the point of sale terminal may be placed into the store clerk mode or state to allow additional functionality to what would be provided to a customer. In some cases, the POS terminal may remain in a self-checkout mode until the store employee enters a code. This may assume the employee is merely providing temporary assistance. Other options are possible.

Instead of, or in addition to, a camera detecting people in proximity to the point of sale terminal, other sensors could equally be used. For example, infrared sensors could detect people in proximity to the point of sale terminal. Other proximity type sensors such as radar, lidar, ultrasonic sensors, light emitting diode (LED) time of flight sensors, other motion detectors, among others could equally be used.

In other cases, other types of sensors may be used for the identification of the store employee or sales clerk. For example, radio frequency identification (RFID) could be used to identify a store clerk based on the badge worn by such store clerk. In other cases, the store clerk may have an active or passive device associated with the employee, and short range wireless communications could be used to identify that the clerk or employee is proximate to the point of sale terminal. For example, the employee may have a portable scanner or mobile device that could communicate with the point of sale terminal. In other cases, identifying information from the personal mobile device of the employee may be placed into a database and short range communications such as Bluetooth may be used to make a determination about the identity of the person proximate the point of sale terminal.

Therefore, for example, an employee may walk up to a point of sale terminal and a short range communication system may detect the badge or active or passive device associated with the employee and make the determination about the category of the person proximate the terminal.

Further, in some cases, other sensors not associated with the point of sale terminal may be used to determine a category of the person proximate to the terminal. In one example, security camera footage from inside the store may be used to both identify that a person is proximate to the point of sale terminal and that the person belongs to a certain category (store clerk, customer, manager, etc.). Data from such external sensors may be used independently to make the determination, or the data may be combined with sensors associated with the point of sale terminal when making the determination.

In some cases, other biometric information could be used to identify a store employee. For example, the store employee may need to place their finger on a fingerprint reader to allow identification of the employee.

Further, in some cases, information from a customer may be used to identify that the person proximate to the point of sale terminal is a customer. For example, the customer may have an application that they have loaded onto their mobile device and may have opted into a rewards program which allows for the identification of the customer when the customer is in the retail location. In this case, the mobile device of the customer may communicate through short range communications with the point of sale terminal to allow a determination about the category of the person and in some cases the identity of the person to be made.

In some cases, the customer may have opted into a loyalty program in which their image is stored and therefore facial recognition could identify the customer.

In some cases, the customer may have opted into a loyalty program in which other biometric information such as their fingerprint information is stored in a database and therefore a fingerprint scan could be used to identify the customer.

Other options are also possible.

Figure 3:
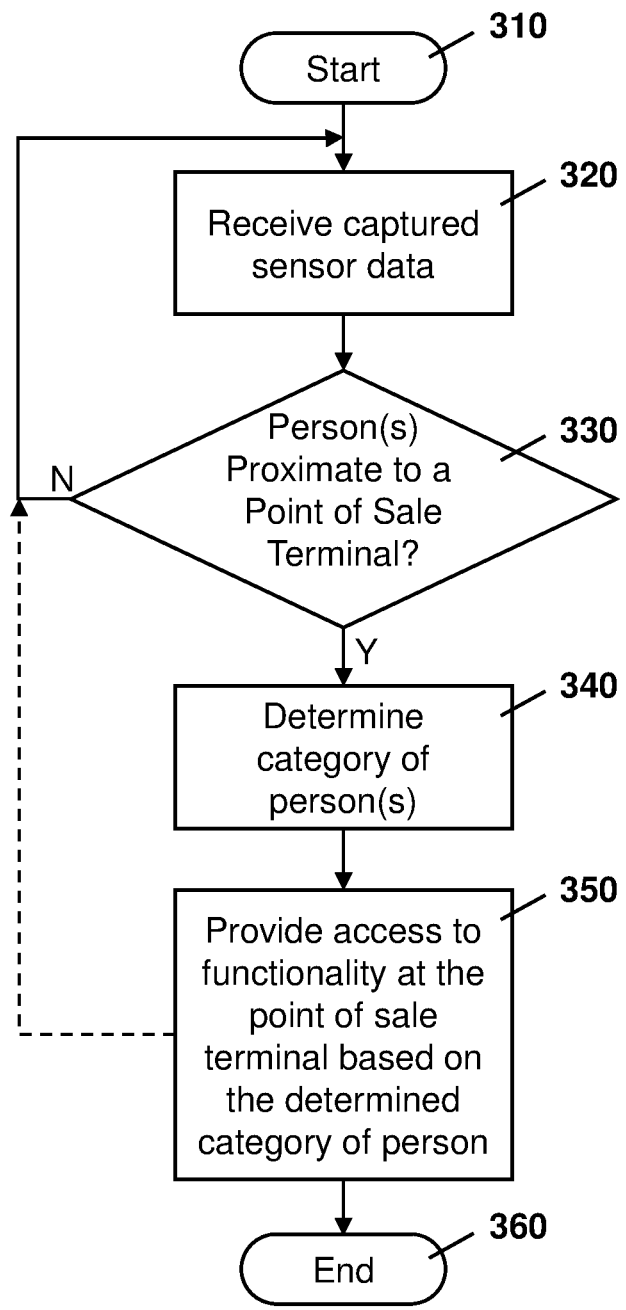
FIG. 3 is a process diagram showing a method for detecting a category of person proximate to a point of sale terminal and configuring the point of sale terminal based on such category.

Reference is now made to FIG. 3. In the embodiment of FIG. 3 the process starts at block 310 and proceeds to block 320 in which sensor data is received at the computing device.

As provided above, the sensor data received at the computing device could be from one or more image capture sensors. For example, the image capture sensors could be cameras affixed to or associated with a point of sale terminal. Such point of sale terminal may have a single camera, or a plurality of cameras. For example, if the point of sale terminal is on a traditional sales counter, then two cameras may be utilized to capture images, one for the front of the point of sale terminal and one for the back. In other cases, only a single point of terminal image capture device may be used, for example if the point of sale terminal is against a wall in the store.

In other cases, the sensor data may include short range wireless communications. For example, if an employee has a badge or name tag having an RFID transceiver, then the sensor data may include the short range communications received from the RFID tag. Similarly, if the employee carries a transaction device such as a scanner, such transaction device may communicate over short range communication with the point of sale terminal to indicate the employee's presence near the terminal.

In still further cases, a combination sensors may be used. For example, cameras could be used to detect whether a person is present and a short range communication sensor may be used to indicate the category of person. For example, if a camera is used to detect that a person is present but no short range communication signal is received, this may be indicative of a customer or non employee being proximate to the point of sale terminal.

Other options are possible.

From block 320, the process of FIG. 3 proceeds to block 330 in which a check is made to determine whether a person is proximate the point of sale terminal. As indicated above, this may be based on images captured by an image capture sensor, through short range communication, through positional sensors such as radar, lidar, infrared or other similar sensors, or a combination of sensors.

From block 330, if no person is detected proximate to the point of sale terminal then the process proceeds back to block 320 to continue monitoring received captured sensor data.

If, at block 330, is determined by the computing device that one or more people are proximate to the point of sale terminal, the process proceeds from block 330 to block 340 in which a category of the one or more people proximate to the point of sale terminal may be determined.

Specifically, in one embodiment only two categories may exist. These include a customer category and a store clerk category. The store clerks may have biometric or other identifying information stored at, or accessible to, the computing device. For example, if the determining comprises processing image data captured by a camera, images of the store clerks employed by the store may be saved at the computing device or on a network device associated with the computing device. A processor at the computing device could perform image recognition to determine whether the image captured matches any store clerk. If yes, the category would be determined to be a store clerk category for the person proximate to the point of sale terminal. If no match is found, then the person proximate to the point of sale terminal may be considered to be a customer in the customer category. In this case, the determination of the category is based on whether the person is a store clerk or is not a store clerk.

Further, if more than one store employee is detected, various options are possible, including considering only the closest person. The closest person could be detected by image processing. For example, the closest person may have the largest image on an image capture apparatus. In other cases, if the camera is an overhead camera, image processing could determine who is closest. In other cases, other sensors such as range finding sensors could be used. Other options are possible.

In some cases, the determination of the category of person may use short range communications received at the computing device. For example, in some cases an employee may have a badge, portable device, or other similar device that may communicate with the computing device to identify the holder of the device. In some cases, store clerks may register their own personal cellular devices with the computing device or with a network device associated with the computing device, and such information may be stored and used to identify that the person proximate to the point of sale terminal is a store employee.

In some cases, other sensors such as a fingerprint sensor may be utilized at the point of sale terminal. Employees may have fingerprint data stored at the computing device or at a network element associated with the computing device and utilize the fingerprint sensor for identification of the employee.

If multiple people are detected proximate to the point of sale terminal, the determination at block 340 may be performed multiple times to identify the category for each of the people at the point of sale terminal.

While two categories are described above, in other cases, multiple categories could exist. For example, three categories may be used, namely a customer category, a store clerk category and a manager category. In this case, biometric information from managers may be stored at the computing device or at a network element associated with the computing device and be used to make the determination at block 340. As explained below, a manager may have additional privileges or access to the computing device than a store clerk.

In some cases, customers may be distinguished into known customers and unknown customers. For example, customers may opt into a customer loyalty program which allows the merchant to store certain identifying information about the customer. In this case, a known customer may, as explained below, have additional privileges on checkout then an unknown customer.

Other options are possible.

From block 340, once the category of person or persons proximate to the point of sale terminal is identified the process may proceed from block 340 to block 350. At block 350, the point of sale terminal may be configured based on the category of person at the terminal.

In one example, the point of sale terminal may, by default, be in a customer mode to allow any customer to walk up to the point of sale terminal and utilize the point of sale terminal. In this case, the user interface and permissions on the point of sale terminal may be set such that a customer is capable of performing a self checkout operation.

However, a customer may not be allowed to perform certain actions, such as to return items utilizing a point of sale terminal on their own, whereas an employee may be provided with options such as returns, processing coupons, applying rebates, among other options.

Therefore, a permission stack associated with the point of sale terminal may be modified based on the category of person proximate to such point of sale terminal.

For example, a simplified permission stack for a customer may include:

TABLE 1

Example permission stack for a Customer Category

| | |
|---|---|
| Maximum Purchase | $350 |
| Returns | N |
| Coupons | N |
| Discount codes | N |
| Price override | N |

TABLE 1-continued

Example permission stack for a Customer Category

| | |
|---|---|
| Removal of previously scanned items | N |
| Inputting of Loyalty Information | Y |
| Credit/Debit Payments | Y |
| Cash Payments | N |
| Access to cash tray | N |

A simplified permission stack for a store clerk category may include:

TABLE 2

Example permission stack for a Sales Clerk Category

| | |
|---|---|
| Maximum Purchase | $1000 |
| Returns | Y |
| Coupons | Y |
| Discount codes | Y |
| Price override | N |
| Removal of previously scanned items | Y |
| Inputting of Loyalty Information | Y |
| Credit/Debit Payments | Y |
| Cash Payments | Y |
| Access to cash tray | Y |

Thus, comparing Table 1 to Table 2, an employee has more permissions than a customer at the point of sale terminal would.

Further, a manager may have a permission stack with a higher maximum purchase limit, permissions to include price overrides, among other options. Thus, the granularity could be further enhanced and an employee permission stack on a point of sale terminal could be smaller than a manager permission stack, and therefore if the category of person proximate the point of sale terminal is a manager, different options such as a higher value of allowable refund could be granted.

Similarly, different granularity may be applied to different categories of customers. If a customer is identified as described above, the returning customer may have more options or permissions than a new customer or an unknown customer. For example, a known customer may be allowed to make larger purchases without approvals in some cases.

Based on the permission stack, a user interface of the point of sale terminal may be configured to obscure elements of the check out not accessible for that category. In some cases, the user interface may be completely different between these self checkout mode that a customer may view and an employee point of sale view that may occur if the category of the person is identified as a store clerk category.

For example, a touch screen in the customer mode may allow a customer to input a universal product code or item code for a type of item, include a button for scanning a loyalty card, a button prompting the payment screen to appear, among other options.

Figure 4:
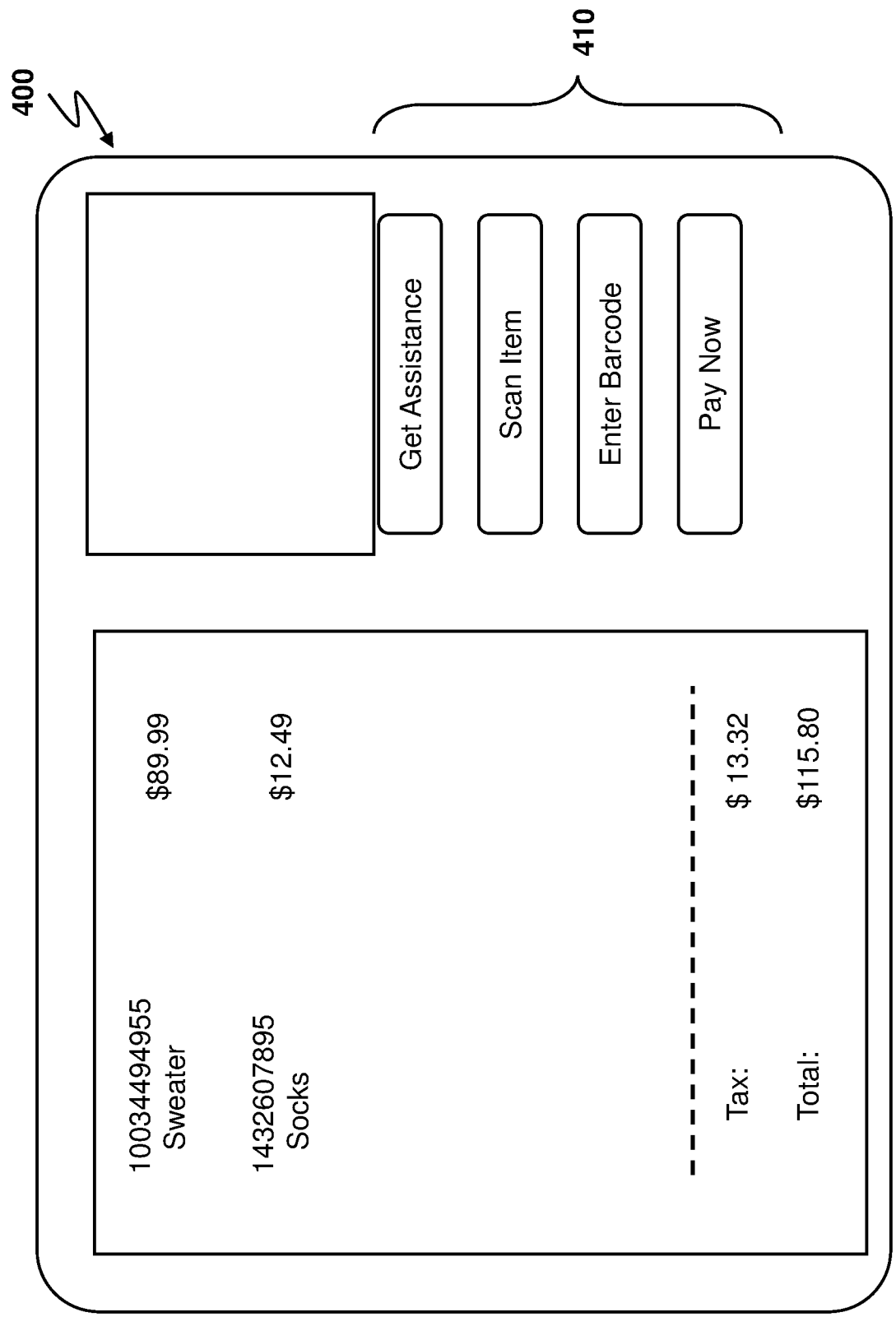
FIG. 4 is an example user interface for a point of sale terminal in a customer category mode.

For example, reference is now made to FIG. 4 in which an example user interface in a customer category mode may be presented to the user. In the example of FIG. 4, a user interface 400 includes various options shown with buttons 410 that are provided to the user. The buttons that are enabled would be based on the mode of operation and therefore based on the permission stack for that mode of operation. In the example of FIG. 4, the user is presented with the options to scan an item, enter a barcode or pay. Further, a button to get assistance could either call a local store employee or call a remote employee. If the call is to a remote employee, a voice or video call may be started with such remote employee.

The same touch screen in the store clerk mode could have buttons to allow for returns, to enter coupons or discount codes, to perform price overrides, to open a cash drawer, among other options.

Figure 5:
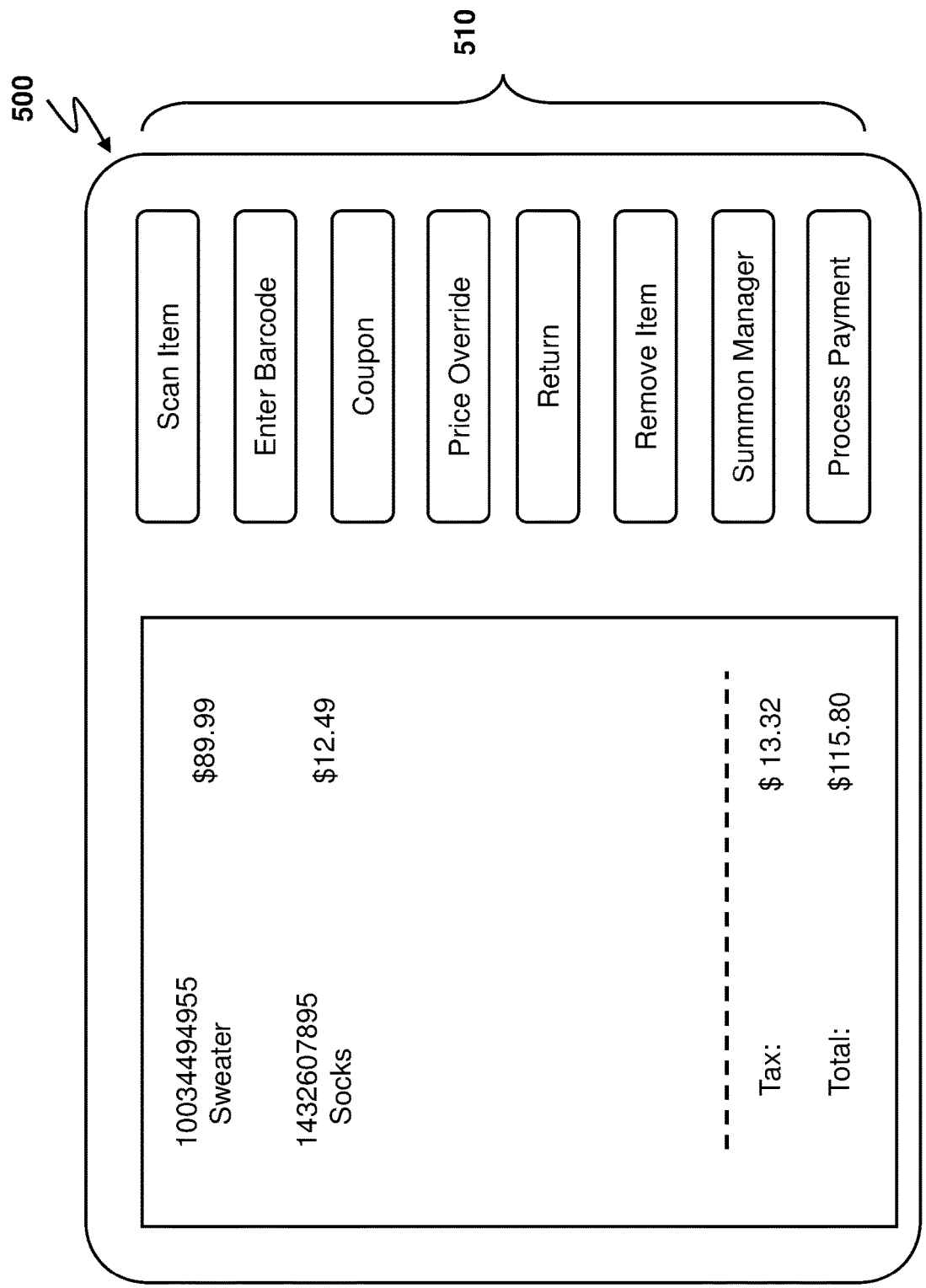
FIG. 5 is an example user interface for a point of sale terminal in a store clerk category mode.

For example, reference is now made to FIG. 5 in which an example user interface in a store clerk mode may be presented to the user. In the example of FIG. 5, a user interface 500 includes various options shown with buttons 510 that are provided to the user. The buttons that are enabled may be based on the mode of operation and therefore based on the permission stack for that mode of operation. In the example of FIG. 5, the user is presented with options to scan an item, enter barcode, enter coupons, do a price override, perform a return, remove an item that was already scanned, summon a manager, or process a payment.

As will be appreciated by those skilled in the art, the embodiments and user interfaces of FIGS. 4 and 5 are merely provided for illustration and are not limiting to the type of user interface that may be presented based on the mode of operation of the point of sale terminal. Each user interface may include more options or less options to be presented to a user based on the implementation, and the design of the user interface could be individualized for each merchant. Further, while the embodiments of FIGS. 4 and 5 show a similar layout, in practice different layouts could be presented depending on the mode of operation of the point of sale terminal, and therefore a user interface for a customer category could be significantly different from a user interface for a store clerk category in some cases.

In some embodiments, the detection of a customer without a store clerk could prompt the transaction to be curated, for example remotely. Thus, if a customer is determined to be interacting with the point of sale terminal, a connection may be made over a network to allow the customer to be assisted in the transaction. Such assistance may be verbal by allowing an employee working from home or a remote data centre to guide a customer through the transaction.

In some cases, the assistance may be through a video chat. The remote customer service representative may have video access to the customer and/or the counter being used at the checkout in order to monitor and assist the customer in performing the transaction. In some cases, the customer may be able to see the customer service representative in a portion of the checkout screen.

In some cases, the detection of the customer without a store clerk may lead to certain physical changes at the point of sale terminal. For example, a screen on the point of sale terminal may be actuated to face the customer. This could occur, for example, if the point of sale terminal is on a traditional sales counter in which the screen would generally face the store clerk.

Based on the above, using sensors at a point of sales terminal or at a retail location, sensor data may be analyzed and a person may be detected next to a point of sales terminal. A category for the person may be determined and based on the category, the point of sale terminal may selectively allow certain operations at the terminal.

Referring again to FIG. 3, in some embodiments, from block 350, the process may proceed back to block 320 to continue to monitor received captured sensor data. For example, if a transaction has already started in a customer self checkout mode, and received sensor data indicates that an employee has moved into proximity with the point of sales terminal, this may provide extra features on the checkout. For example, an employee override button may appear on a portion of the checkout user interface to allow for items to be removed from previously scanned items, to process a coupon, among other options.

Similarly, if the process has started in a store clerk category mode and the store clerk moves away from the point of sale terminal then the point of sale terminal may lock or reset to prevent misuse of the terminal while the store clerk is away from the terminal.

From block 350, the process proceeds to block 360 and ends.

The embodiment of FIG. 3 may be implemented to utilize a computing device associated with the point of sale terminal, a computing device associated with the network element, or both.

Figure 6:
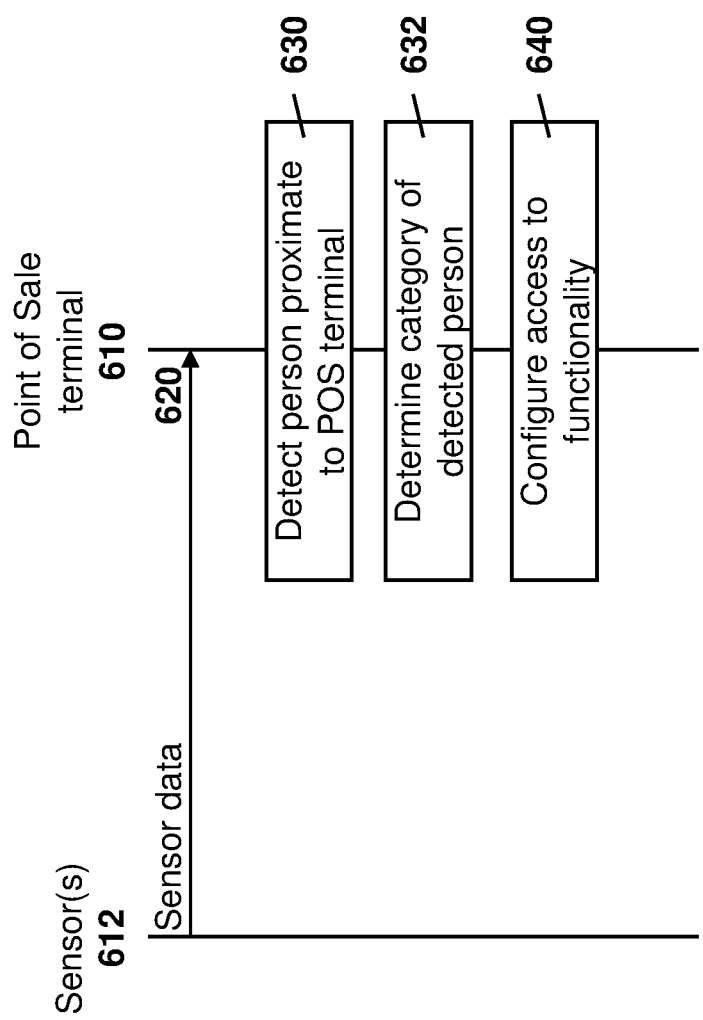
FIG. 6 is a dataflow diagram showing a process for configuring the point of sale terminal when the computing device is at the point of sale terminal.

Reference is now made to FIG. 6. In the embodiment FIG. 6 the process may be performed by a processor on a point of sale terminal computing device. In particular, point of sale terminal 610 may receive sensor data from sensors 412, as shown with message 420. Sensors 412 may be part of the point of sale terminal, including one or two cameras, be short range communication sensors, or be biometric sensors, position sensors, among other options. Sensors 612 may further be external sensors communicating with point of sale terminal 610.

Based on the processing of the sensor data of message 620, the processor at the point of sale terminal may detect whether a person is proximate to the point of sale terminal, and if yes, determine a category of the detected person, as shown with blocks 630 and 632.

The point of sale terminal 610 may then further configure access to functionality at the point of sale terminal, as shown at block 640. Such configuration may include changing permission stacks, updating a user interface for the particular category of person near the point of sale terminal, activating motors or servos to reposition elements of the point of sale terminal, among other similar options.

Figure 7:
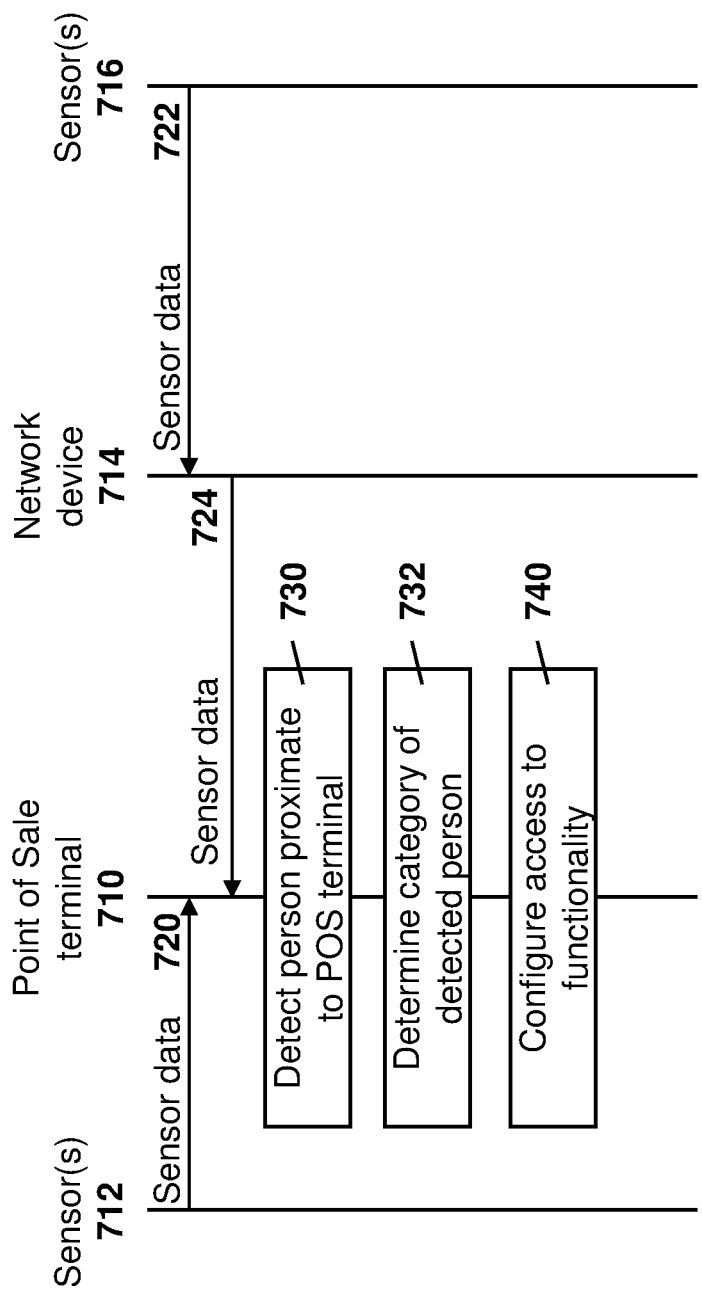
FIG. 7 is a dataflow diagram showing a process for configuring the point of sale terminal when a second computing device provides sensor information.

In a further embodiment, sensors associated with a second computing device may provide the data to the point of sale terminal to do the processing. Reference is now made to FIG. 7.

In the embodiment of FIG. 7, a point of sale terminal 710 may include one or more sensors 712, which may be internal to or external to the point of sale terminal 710. Further, point of sale terminal 710 may communicate with a network device 714, for example through a communication subsystem.

Network device 714 may have access to one or more sensors 716, which may provide the network device 714 with sensor data.

For example, network device 714 may be a security system for the store and have security camera inputs.

In the embodiment of FIG. 7, point of sale terminal 710 may receive sensor data from sensors 712, shown with message 720.

Further, network device 714 may receive sensor data from sensors 716, as shown with message 722. The sensor data may be pre-processed in some cases at network device 714 and sent to the point of sale terminal 710 as sensor data 724. However, the pre-processing is optional and, in some cases, raw sensor data may be sent to the point of sale terminal 710.

Further, in some cases, point of sale terminal 710 may receive only one of message 720 or message 722, and the other message would be optional.

Based on receipt of message 720 and/or message 722, the point of sale terminal may process the sensor data to detect whether a person is proximate to the point of sale terminal, as shown at block 730.

If a person is proximate to the point of sale terminal 710, the process proceeds to block 732 in which a category of one or more persons detected can be determined, as described above.

Based on the category of the one or more persons determined at block 732, the functionality of the point of sale terminal can be configured at block 740. Again, this can include configuring the user interface, actuating elements at the point of sale terminal, changing permission stacks at the point of sale terminal, among other functionalities.

Figure 8:
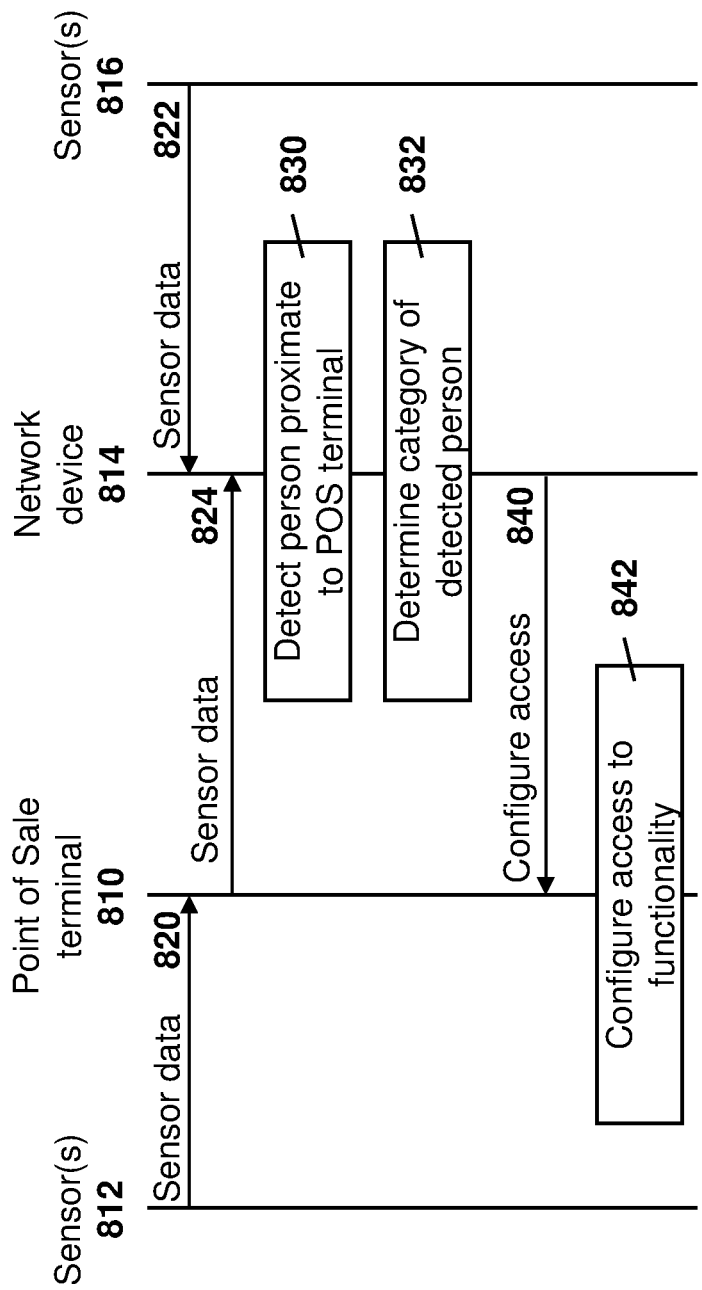
FIG. 8 is a dataflow diagram showing a process for configuring the point of sale terminal when a second computing device provides processing.

In still further embodiments, other computing devices could perform some or all of the processing of the sensor data. Reference is now made to FIG. 8.

In the embodiment of FIG. 8, a point of sale terminal 810 may include internal or external sensors 812 which may provide sensor data to the point of sale terminal 810.

Point of sale terminal 810 may further communicate with a secondary computing device such as network device 814. Network device 814 could be any computing device that is connected to the point of sale terminal 810 through a local or wide area network.

Network device 814 may receive input from sensors 816, which may be internal or external to the network device 814.

Therefore, point of sale terminal 810, in some embodiments, may receive sensor data in message 820 from sensors 812 and may provide this sensor data to the network device 814, shown with message 824.

Network device 814 may further receive sensor data from sensors 816 as shown with message 822.

In some embodiments, network device 814 may rely solely on sensor data received from sensors 816, and therefore message 822 is optional. In other cases, network device 814 may rely solely on sensor data from sensors 812 and therefore message 822 is optional.

Based on sensor data received from message 822 and/or message 824, the network device may perform processing on the sensor data to detect whether a person is proximate to the point of sale terminal, as shown at block 830. For example, the network device 814 may perform image processing. This may be used, for example, where the computing power of network device 814 is higher than the computing power of point of sale terminal 810 in some cases.

If a person is detected to be proximate to the point of sale terminal at block 830, then the network device 814 may, at block 832, determine a category of one or more persons detected. As indicated above, in some cases this may include searching a database of employees to find if the sensor data matches data associated with those employees. For example, employees may previously have provided the company with data such as their image, biometric data, short range communication identification codes for personal devices, among other such data. The category may try to match sensor data with such stored data.

If no match is found, then the persons may be considered to be customers and categorized as such.

In the embodiment of FIG. 8, network device 814 may determine the mode and functionality of the point of sale terminal based on the determination at block 832, and provide a message 840 to configure the functionality of the point of sale terminal 810.

Point of sale terminal 810 may receive message 840 and, based on the contents of the message, configure access to the functionality of the point of sale terminal. As will be appreciated by those in the art, message 840 may be sent in a secure manner to ensure the legitimacy of the message.

The above therefore describes methods and systems for the configuration of a point of sale terminal based on the detection and categorization of one or more persons proximate to such point of sale terminal.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method comprising:
operating a point of sale terminal in point of sale mode;
receiving captured sensor data;
detecting, based on the captured sensor data, a person proximate a point of sale terminal;
determining that a category for the detected person proximate the point of sale terminal is an authorized store clerk category using biometric data stored for people in the authorized store clerk category;
initiating a transaction in the point of sale mode;
receiving further sensor data during the transaction;
determining, based on the further sensor data, that the detected person is no longer proximate the point of sale terminal; and
based on the determining that the detected person is no longer proximate the point of sale terminal, pausing the transaction.

2. The method of claim 1, wherein the point of sale mode comprises providing elevated permissions at the point of sale terminal over permissions provided in self checkout mode.

3. The method of claim 1, wherein the sensor data includes images captured by a camera associated with the point of sale terminal.

4. The method of claim 1, wherein the sensor data includes images captured by at least one security camera associated with a retail location for the point of sale terminal.

5. A computing device comprising:
a processor; and
a communications subsystem;
wherein the computing device is configured to:
set a point of sale terminal to operate in point of sale mode;
receive captured sensor data;
detect, based on the captured sensor data, a person proximate a point of sale terminal;
determine that a category for the detected person proximate the point of sale terminal is an authorized store clerk category using biometric data stored for people in the authorized store clerk category;
initiate a transaction in the point of sale mode;
receive further sensor data during the transaction;
determine, based on the further sensor data, that the detected person is no longer proximate the point of sale terminal; and
based on the determining that the detected person is no longer proximate the point of sale terminal, pause the transaction.

6. The computing device of claim 5, wherein the computing device is associated with the point of sale terminal, wherein the computing device further comprises:
at least one display;
at least one input device; and
one or more sensors;
wherein the captured sensor data comes from the one or more sensors associated with the computing device.

7. The computing device of claim 5, wherein the computing device is separate from the point of sale terminal, wherein the computing device is configured to selectively provide access to functionality by providing configuration messages to the point of sale terminal.

8. The computing device of claim 5, wherein the sensor data includes images captured by at least one security camera associated with a retail location for the point of sale terminal.

9. A non-transitory computer readable medium for storing instruction code which, when executed by a processor of a computing device cause the computing device to:
set a point of sale terminal to operate in point of sale mode;
receive captured sensor data;
detect, based on the captured sensor data, a person proximate a point of sale terminal;
determine that a category for the detected person proximate the point of sale terminal is an authorized store clerk category using biometric data stored for people in the authorized store clerk category;
initiate a transaction in the point of sale mode;
receive further sensor data during the transaction;
determine, based on the further sensor data, that the detected person is no longer proximate the point of sale terminal; and
based on the determining that the detected person is no longer proximate the point of sale terminal, pause the transaction.

10. The computing device of claim 5, wherein the sensor data includes images captured by a camera associated with the point of sale terminal.

11. The computing device of claim 5, wherein the point of sale mode comprises providing elevated permissions at the point of sale terminal over permissions provided in self checkout mode.

12. The non-transitory computer readable medium of claim 9, wherein the instruction code further cause the computing device to determine that the category for the detected person is not the authorized store clerk category using biometric data stored for people in at least one category.

13. The non-transitory computer readable medium of claim 9, wherein the computing device is associated with the point of sale terminal, wherein the computing device comprises:
at least one display;
at least one input device; and
one or more sensors;
wherein the captured sensor data comes from the one or more sensors associated with the computing device.

14. The non-transitory computer readable medium of claim 9, wherein the computing device is separate from the point of sale terminal, wherein the instruction code further cause the computing device to selectively provide access to functionality by providing configuration messages to the point of sale terminal.

15. The non-transitory computer readable medium of claim 9, wherein the sensor data includes images captured by at least one security camera associated with a retail location for the point of sale terminal.

16. The non-transitory computer readable medium of claim 9, wherein the instruction code further cause the computing device to configure a user interface at the point of sale terminal for self checkout mode.

17. The method of claim 1, further comprising:
- following completion of the transaction, receiving second sensor data;
- detecting, based on the second sensor data, a second person proximate the point of sale terminal;
- determining that a second category for the second person is not the authorized store clerk category using the biometric data stored for people in the authorized store clerk category; and
- based on the determining that the second person is not in the authorized store clerk category, switching the point of sale terminal to operate in self check out mode.

18. The computing device of claim 5, further configured to:
- following completion of the transaction, receive second sensor data;
- detect, based on the second sensor data, a second person proximate the point of sale terminal;
- determine that a second category for the second person is not the authorized store clerk category using the biometric data stored for people in the authorized store clerk category; and
- based on the determining that the second person is not in the authorized store clerk category, switch the point of sale terminal to operate in self check out mode.

* * * * *